US006976690B2

(12) United States Patent
Freeman

(10) Patent No.: US 6,976,690 B2
(45) Date of Patent: *Dec. 20, 2005

(54) BICYCLE TRAILER ATTACHMENT

(76) Inventor: Steve R. Freeman, 8837 Croes Dr., Houston, TX (US) 77055

( * ) Notice: Subject to any disclaimer, the term of this patent is extended or adjusted under 35 U.S.C. 154(b) by 22 days.

This patent is subject to a terminal disclaimer.

(21) Appl. No.: 10/315,419

(22) Filed: Dec. 10, 2002

(65) Prior Publication Data

US 2003/0080534 A1 May 1, 2003

Related U.S. Application Data

(63) Continuation-in-part of application No. 09/430,286, filed on Oct. 29, 1999, now Pat. No. 6,491,316.

(60) Provisional application No. 60/119,723, filed on Feb. 12, 1999.

(51) Int. Cl.[7] .................................... B62K 27/00
(52) U.S. Cl. ........................ 280/204; 280/292
(58) Field of Search .................. 280/204, 202, 280/288.4, 292

(56) References Cited

U.S. PATENT DOCUMENTS

| 2,210,292 | A |   | 8/1940  | Hodgkin            |         |
|-----------|---|---|---------|--------------------|---------|
| 2,756,069 | A | * | 7/1956  | Manngarn           | 280/204 |
| 3,827,613 | A |   | 8/1974  | Meyer              |         |
| 3,877,723 | A |   | 4/1975  | Fahey et al.       |         |
| 4,180,279 | A | * | 12/1979 | Belliveau, Sr.     | 280/204 |
| 4,266,793 | A | * | 5/1981  | Pryor              | 280/204 |
| 4,306,733 | A | * | 12/1981 | Cox                | 280/204 |
| 4,371,184 | A |   | 2/1983  | Henden et al.      |         |
| 4,387,836 | A |   | 6/1983  | Laesch             |         |
| 4,431,205 | A |   | 2/1984  | Speicher et al.    |         |
| 4,759,559 | A |   | 7/1988  | Moulton            |         |
| 4,770,326 | A |   | 9/1988  | Thompson           |         |
| 4,817,833 | A |   | 4/1989  | Rebera             |         |
| 4,848,504 | A |   | 7/1989  | Olson              |         |
| 4,928,985 | A |   | 5/1990  | Nowlin             |         |
| 5,005,847 | A |   | 4/1991  | King et al.        |         |
| 5,020,813 | A |   | 6/1991  | Gottschalk         |         |
| 5,098,113 | A |   | 3/1992  | Albitre            |         |
| 5,232,065 | A |   | 8/1993  | Cotton             |         |
| 5,259,634 | A |   | 11/1993 | Berner et al.      |         |
| 5,303,944 | A |   | 4/1994  | Kalmus             |         |
| 5,328,193 | A |   | 7/1994  | Shiew              |         |
| 5,330,217 | A | * | 7/1994  | McCarthy           | 280/204 |
| 5,340,003 | A |   | 8/1994  | Wilson             |         |
| 5,482,304 | A |   | 1/1996  | Smith              |         |
| 5,573,259 | A |   | 11/1996 | Castillo et al.    |         |
| 5,749,592 | A |   | 5/1998  | Marchetto          |         |
| 5,785,335 | A |   | 7/1998  | George             |         |
| 5,842,710 | A | * | 12/1998 | Couture            | 280/204 |
| 5,860,577 | A | * | 1/1999  | Dunn               | 224/453 |

(Continued)

FOREIGN PATENT DOCUMENTS

DE 3923998 C2 2/1990

(Continued)

Primary Examiner—Avraham Lerner
(74) Attorney, Agent, or Firm—Gregory M. Hasley; Akin Gump Strauss Hauer & Feld, LLP

(57) ABSTRACT

An apparatus is disclosed that attaches to a bicycle seat stem for allowing connection of a trailering device for pulling by the bicycle. The apparatus has an elongated body with an aperture on one end for receiving a bicycle seat stem and a socket on the opposite end for attaching a trailer or other device. A rack can be combined with the apparatus.

18 Claims, 5 Drawing Sheets

U.S. PATENT DOCUMENTS

| | | |
|---|---|---|
| 6,050,580 A | 4/2000 | Pawelek |
| 6,234,503 B1 * | 5/2001 | Ockenden ................... 280/204 |
| 6,244,612 B1 | 6/2001 | Henderson |
| 6,286,847 B1 | 9/2001 | Perrin |
| 6,409,188 B1 * | 6/2002 | Hesmer ..................... 280/79.5 |
| 6,607,208 B2 * | 8/2003 | Dartland ..................... 280/292 |
| 2001/0038190 A1 | 11/2001 | Provencher |

FOREIGN PATENT DOCUMENTS

| | | |
|---|---|---|
| FR | 867444 | 10/1941 |

* cited by examiner

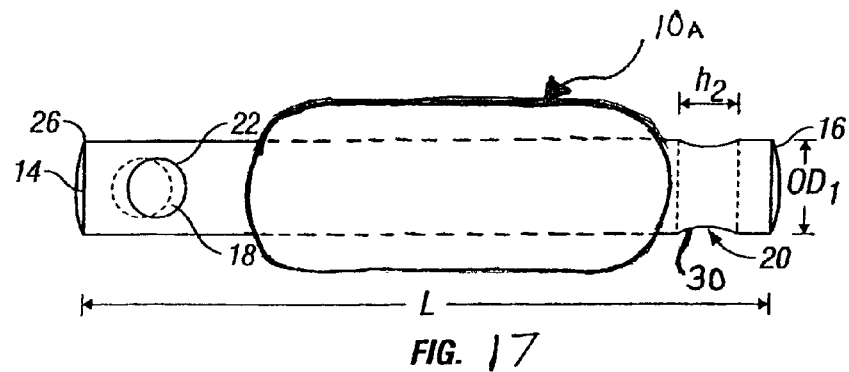
FIG. 17
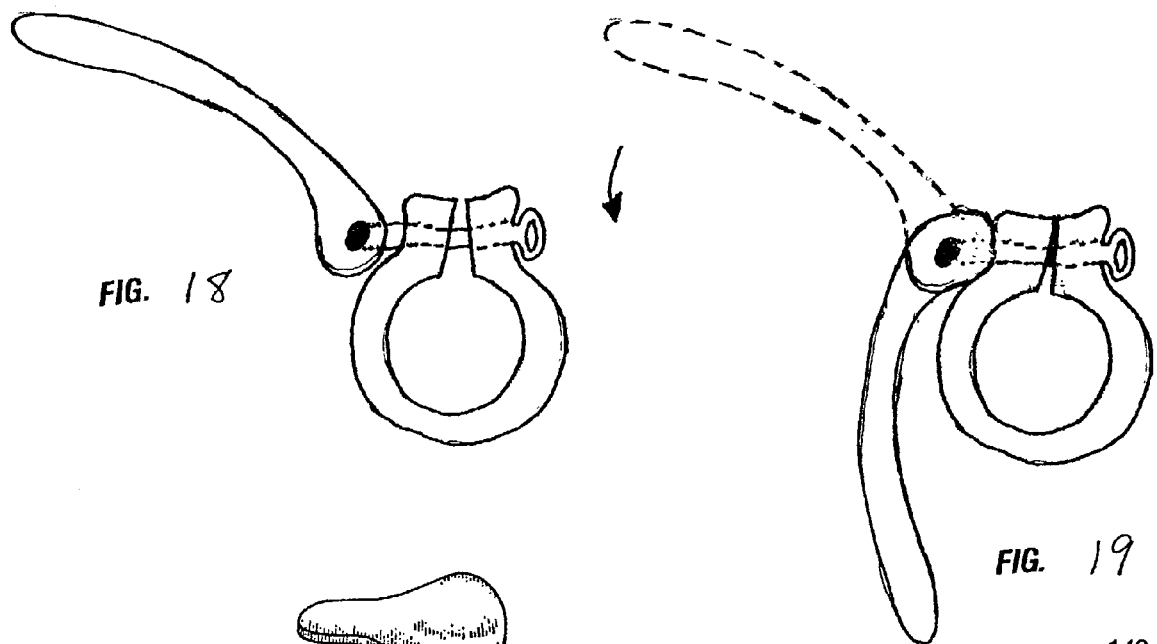
FIG. 18
FIG. 19
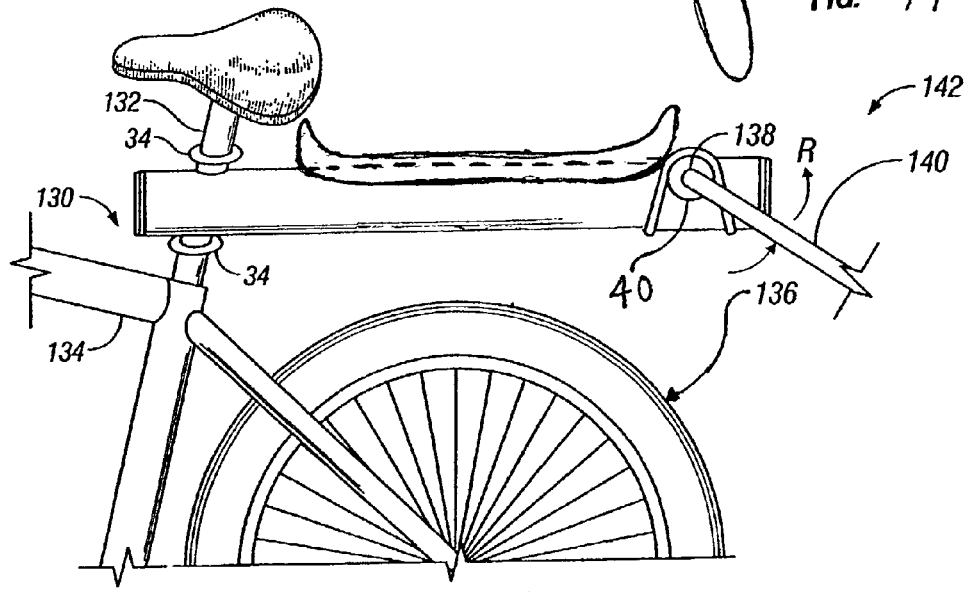
FIG. 20

BICYCLE TRAILER ATTACHMENT

CROSS-REFERENCE TO RELATED APPLICATIONS

This application is a continuation-in-part of U.S. application Ser. No. 09/430,286, filed Oct. 29, 1999 now U.S. Pat. No. 6,491,316 which claims the benefit of U.S. Provisional Application No. 60/119,723 filed Feb. 12, 1999. Both of these previous applications are hereby incorporated by reference in their entirety for all purposes.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to bicycle equipment. More particularly, the present invention relates to bicycle accessories such as a trailering device.

2. Description of the Related Art

Specific items have been transported by bicycle, either by direct attachments to the frame of the bicycle or devices designed to trailer behind the bicycle. For example, U.S. Pat. No. 5,482,304 (Smith) describes a device for trailering a pull-type golf cart by bicycle. U.S. Pat. No. 5,842,710 (Fleurimont) describes a device for coupling one bicycle with another. U.S. Pat. No. 5,005,847 (King et al) describes a device for trailering a fishing apparatus by bicycle. U.S. Pat. No. 5,259,634 (Berner) describes a device for trailering an infant by bicycle. U.S. Pat. No. 4,759,559 (Moulton) describes a collapsible utility cart for multiple purposes. Other patents that describe various ways of pulling a trailer behind a bicycle include U.S. Pat. No. 3,877,723 (Fahey et al) and U.S. Pat. No. 5,098,113 (Albitre).

Disadvantages associated with the prior art trailering devices include one or more of the following: (1) the devices are specific in utility and perform a single function; (2) the devices being trailered must be modified for trailering by bicycle and re-modified for use without bicycle; (3) the devices work with only the specific accompanied cart attachment(s); (4) the devices are not designed to work with the multitude of wheeled devices currently available in the marketplace; and (5) the devices cannot be left in place as part of the bicycle when utilizing the bicycle for riding and not transporting. It would be desirable to have a trailering device that would enable almost any multi-wheeled cart to be safely transported by bicycle when in use and with little additional weight, could be left in place when the bicycle is utilized for just riding and not trailering.

BRIEF SUMMARY OF THE INVENTION

Disclosed is an apparatus that attaches to a bicycle for allowing connection of a trailering device for towing by the bicycle. In a preferred embodiment, the apparatus is combined with a carrying rack allowing the cyclist the option of hauling a limited amount of goods on the rack and/or hauling a trailering device.

As used herein, the term trailering device includes luggage carts, golf carts, portable folding carts, garden carts, shopping carts, mail carts, dollies, trailers, lawn mowers, power washers, wheeled garbage cans, wagons, rickshaws, market carts, beach carts, other wheeled pull carts, and the like.

In one embodiment, the apparatus preferably has an elongated, tubular body with a first aperture through the body on one end for receiving a bicycle seat stem and a socket in the form of a second aperture or a slot on the opposite end of the body for attaching a trailer or other device. Preferably, the apparatus is affixed to the bicycle seat stem by removing the bicycle seat stem from the bicycle frame and inserting the stem through the first aperture.

The elongated body of the apparatus is preferably manufactured from a substantially rigid material and may be tubular in configuration. The elongated tubular body of the device generally should be of a larger internal diameter than the bicycle seat stem such that the body can encompass the seat stem. Additionally, the body preferably has a larger internal diameter than the bar/grip attached at the opposite end from the seat stem. As used herein, the term "bar/grip" is a generic term referring to handles, grips, hand grips, pull bars, knobs, and the like as are commonly known and used on wheeled devices such as can be trailered. Preferably, the elongated body is long enough to prevent the device being pulled from making contact with or rubbing against the bicycle.

The first aperture preferably passes through the elongated body in angled relation to vertical. The first aperture is also referred to herein as the angled aperture. For attachment to a bicycle, the seat stem of the bicycle is inserted in the angled aperture. Preferably, the aperture is sized to accommodate the majority of bicycle seat stems and is angled to account for the angled nature of bicycle seat stems installations.

Preferably, the present apparatus can ride freely at the base of the seat stem or a vertical stop can be installed. The vertical stop allows the trailer attachment to ride at any given vertical position along the bicycle seat stem and does not hinder rotative movement around the seat stem. One example of an acceptable vertical stop is an o-ring that can be inserted around the seat stem, however other techniques can also be used. The o-ring preferably has an internal diameter slightly smaller than the seat stem and an external diameter larger than the angled aperture. The o-ring is preferably manufactured of an elastic material such that it expands around the seat stem but contracts into place when positioned.

The socket, in the form of a second aperture or a slot, at the opposite end from the seat stem is preferably approximately perpendicular to the seat stem. The socket is preferably sized such that a bar/grip may be inserted and allows for rotative movement of the bar/grip of the device being trailered. An elastic o-ring or other securing means can be used to secure the bar/grip from sliding out the socket.

When using a tubular elongated body, end caps preferably with a tapered lip and a diameter slightly smaller than the internal diameter of the body can be inserted into the ends of the body. The end caps are preferably of a low profile such that they do not hinder the peddling action of the cyclist. The end caps can be reflector caps. This is especially preferred for the end cap opposite to the seat stem. Reflector caps are preferably red in color in accordance with bicycle safety regulations to add to the visibility of the bicycle.

When combining the apparatus with a rack, the rack is preferably affixed to the apparatus body. The rack is preferably affixed to an upper portion of the body and preferably in a permanent manner. Preferably, when utilizing the apparatus combined with the rack, the apparatus can be secured in a fixed position relative to the bicycle seat post. Most preferably, the apparatus is secured with a quick release mechanism allowing simple hand opening or closing to allow or prevent rotation.

BRIEF DESCRIPTION OF THE SEVERAL VIEWS OF THE DRAWINGS

A better understanding of the disclosed embodiments of present invention can be obtained when the detailed description set forth below is reviewed in conjunction with the accompanying drawings, in which:

FIG. 17 depicts another embodiment of a trailer attachment having a storage rack.

FIG. 18 depicts a release mechanism for use with various embodiments of trailer attachment devises in an open position allowing rotation about the post.

FIG. 19 depicts a release mechanism for use with various embodiments of trailer attachment devises in a closed position generally fixing the attachment relative to the seat post.

FIG. 20 depicts a bicycle with a trailer attachment apparatus having a storage rack pulling a cart.

DETAILED DESCRIPTION OF INVENTION

Figure 1:
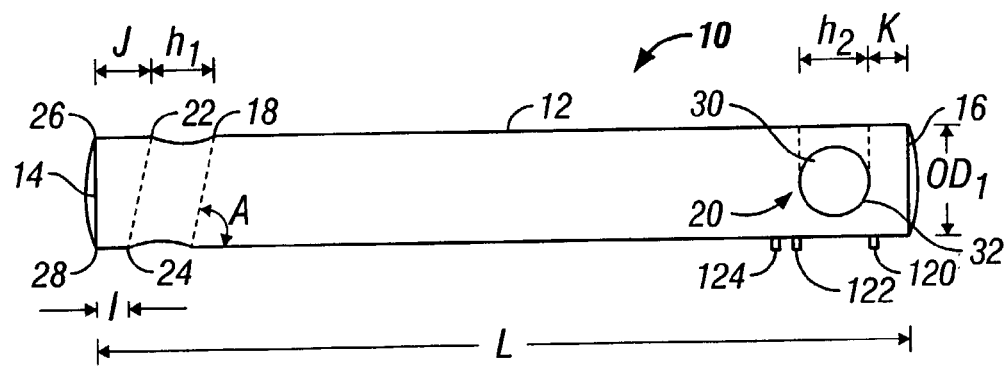
FIG. 1 is a side view of a trailer attachment apparatus.
Figure 2:
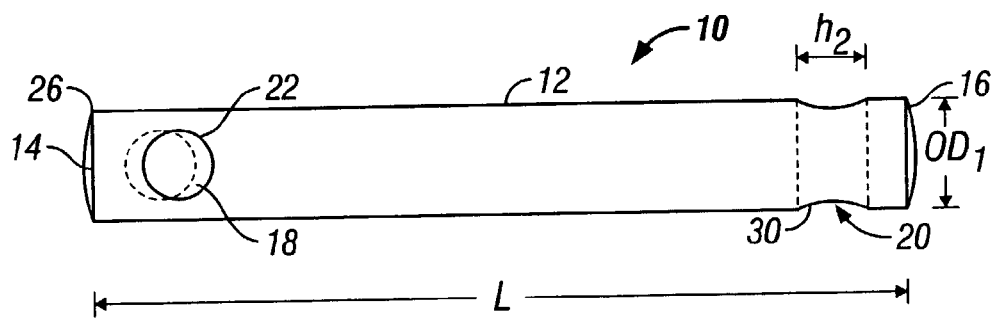
FIG. 2 is a top view of the apparatus of FIG. 1.
Figure 3:
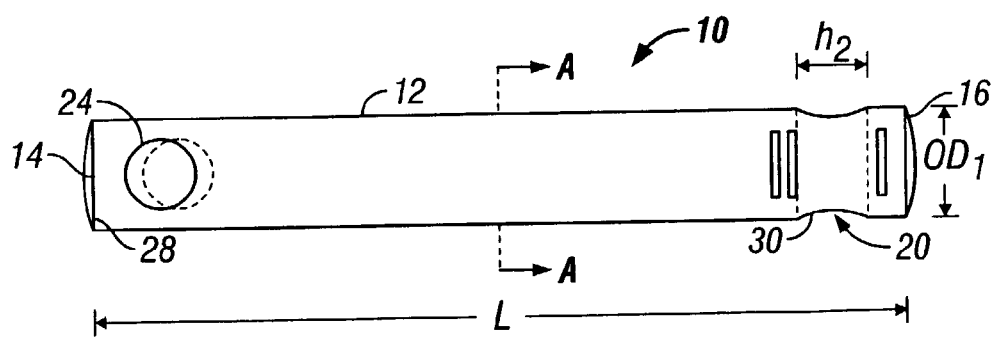
FIG. 3 is a bottom view of the apparatus of FIG. 1.

As shown in the figures, the present invention provides a apparatus and method for trailering devices behind a bicycle. FIGS. 1–3 depict side, top, and bottom views of an embodiment of trailer attachment apparatus 10. Trailer attachment apparatus 10 has an elongated body 12 having a first end 14 and a second end 16. Elongated body 12 has a length (L) between first end 14 and second end 16. Preferably, length (L) is such that the device being trailered does not make contact with the bicycle. Length (L) is preferably at least about 13 inches because that is the approximate minimum distance from the seat stem to the apex of the rear bicycle tire for the majority of bicycles currently available in the marketplace. More preferably, length (L) is 16 inches. However, as one of skill in the art will recognize, length (L) can be as small as a few inches or upwards of two feet depending upon the dimensions of a specific bicycle or device to be trailered.

Elongated body 12 can be tubular, a solid bar, or of a partially tubular configuration. Preferably, body 12 is constructed from polyvinyl chloride (PVC) material. Body 12 can be constructed from premolded tubing or by injection molding PVC. PVC provides minimal friction between apparatus 10 and a bicycle seat stem or bar/grip of a trailered device. Other rigid materials including steel, aluminum, titanium, polypropylene, polyethylene, polybutylene, and the like can also be utilized for body 12.

Body 12 has an aperture 18 near first end 14. Aperture 18 is adapted to receive a bicycle seat stem (not shown). Preferably, the aperture 18 has a diameter ($h_1$) adequate to accommodate bicycle seat stem sizes ranging from at least about ⅞ inch to about ⅝ inches. This size range encompass the majority of bicycle seat stem sizes currently available. Preferably, aperture 18 has a diameter of approximately ⅝ inches to accommodate this size range and allow for the rotative movement of the device about the seat stem. As one of skill in the art will recognize, diameter ($h_1$) can be of whatever dimension is necessary to accommodate any odd or irregularly sized seat stem. Many of the newer, lighter weight bicycles manufactured of aluminum, titanium, and poly-carbonate have seat stems larger than ⅝ inches. Therefore, aperture 18 may need to be sized with a larger diameter to encompass these larger seat stems. Alternatively, some of the older model, heavy metal bicycles have seat stem diameters smaller than ⅞ inch. Therefore, aperture 18 may need to be sized to accompany these smaller seat stems.

Preferably, aperture 18 is at an angle (A) from horizontal to account for the slanted angle installation of most seat stems. Angle (A) is preferably between about 65 and about 75 degrees from horizontal. More preferably, angle (A) is about 67 to about 72 degrees. Angle (A) can be adapted to allow apparatus 10 to be used with bicycles having seat stems with greater or less slant. As the bicycle seat stem angle changes with bicycle designs, so too can aperture 18 be manufactured to accompany these changes. Preferably, Length (J) from edge 22 of aperture 18 to top 26 of first end 14 is approximately 15/16 inch. Length (I) from edge 24 to bottom of first end 14 is preferably approximately ⅜ inch.

Generally, apparatus 10 can be attached to a bicycle by removing the bicycle seat stem and inserting it through aperture 18. Alternatively, body 12 may be open on one side of aperture 18 to allow apparatus 10 to be press fit onto the seat stem.

Figure 4:
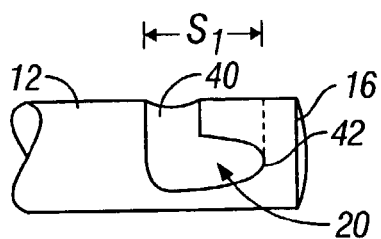
FIG. 4 is a side view of a rear portion of a second trailer attachment apparatus.
Figure 5:
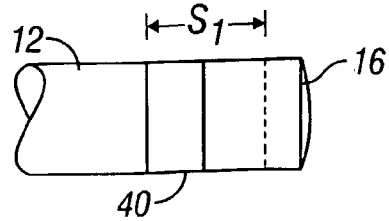
FIG. 5 is a top view of the apparatus of FIG. 4.
Figure 6:
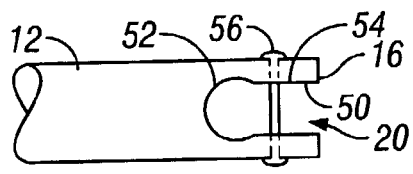
FIG. 6 is a side view of a rear-portion of a third trailer attachment apparatus.
Figure 7:
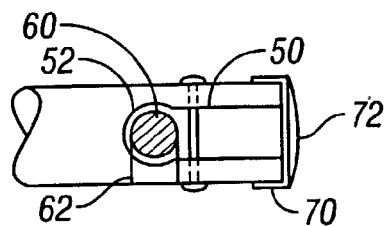
FIG. 7 is a side view of the attachment of FIG. 6 secured to a bar/grip.
Figure 16:
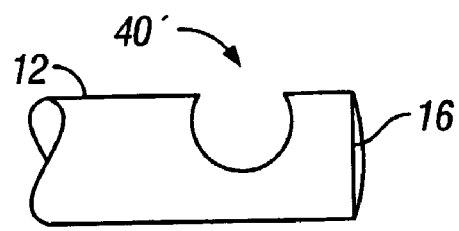
FIG. 16 is a side view of a rear portion of a fourth trailer attachment apparatus.

Body 12 has a socket 20 near second end 16. Socket 20 can be an aperture such as is shown in FIGS. 1–3, a slot 40 such as is shown in FIGS. 4–5 and 16, a rear slot 50 as shown in FIGS. 6–7, or other configurations such as are known to those skilled in the art. Referring to FIGS. 1–3, aperture 30 preferably is approximately perpendicular to the seat stem and is generally sized to receive a bar/grip. Preferably, aperture 30 has a diameter ($h_2$) between about ⅞ inch and ¾ inches. As will be recognized, diameter ($h_2$) can be adapted to various sizes depending upon the size bar/grip being received. Length (K), the distance from the second end 16 to edge 30, of aperture 30 is preferably approximately ⅜ inch.

As shown in FIGS. 4–5 and 16, socket 20 can be configured as a slot 40 on a top portion of body near second end 16. Slot 40 can be of various shapes and configurations such as will accommodate a bar/grip. Slot 40 has an advantage of generally being able to accommodate either an open or closed bar/grip. Referring to an "open" bar/grip, generally indicates a grip or handle that has a free end that is not attached to the device being trailered. (See bar/grip 64 of FIG. 12 A/B). A "closed" bar/grip is any bar/grip not "open" (See examples FIGS. 13 and 14). Slot 40 optionally has a tapered section 42 for receiving and securing a bar/grip in slot 40. Referring to FIG. 16, alternatively, slot '40 can be U-shaped or circular in shape, approximating an aperture off of the center of body 12 but being open through body 12.

As shown in FIGS. 6–7, socket 20 can also be configured as a rear slot 50. Rear slot 50 extends from a second end 16 of body 12. Slot 50 has a base 52 and a channel 54. A bar/grip is received into and passes through channel 54 and into base 52. Rear slot 50 can be sized such that a bar/grip of a given diameter can be forced through channel 54 into base 52 for securing. Alternatively, a lock pin 56 can be inserted through body 12 surrounding channel 54 to secure the bar/grip and prevent the bar/grip from sliding back from base 52. Preferably, base 52 is sized to accommodate most common bar/grip sizes. An o-ring 62 can also be utilized to secure the bar/grip in base 52. An end cap 70 is preferably placed over end 16 of body 12. End cap 70 may alternatively have a reflector 72.

Figure 8:
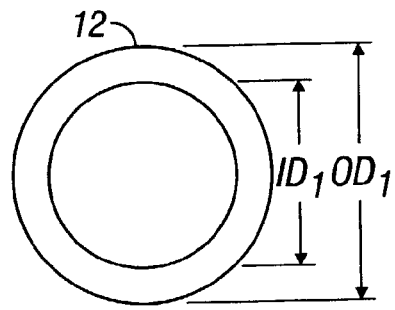
FIG. 8 depicts a cross section taken along the line A—A of FIG. 3.

Referring to FIG. 8, body 12 may be of tubular configuration having an outside diameter ($OD_1$) and an inside diameter ($ID_1$). One acceptable PVC pipe for use in body 12 is SDR—13.5 manufactured by North American Pipe, et al, in standard 1½ inch pipe, with internal diameter ($ID_1$) approximately $1^{19}/_{32}$ inches and outside diameter ($OD_1$) approximately $1^{29}/_{32}$ inches. Other PVC piping such as will be known to those skilled in the art is likewise acceptable. Diameter ($OD_1$) can be sized according to any of the various size seat stems or bars/grips, as long as the internal diameter ($ID_1$) is larger than the seat stem or bar/grip. FIG. 7 depicts a circular cross section of tubular body 12. As will be recognized, other cross section configurations including but not limited, to triangular, rectangular, pentagonal, other polygonal, oval, etc. can be utilized.

Figure 9:
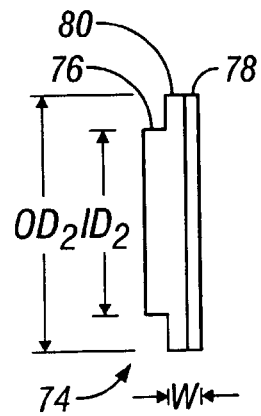
FIG. 9 is a side view of an end cap with reflector.

As shown in FIG. 9, another embodiment of an end cap 74 with reflector 78 can be used to finish apparatus 10. An inner portion 76 of cap 74 preferably has a slightly smaller than internal diameter ($ID_1$) of the PVC pipe of FIG. 8, that is slightly less than about $1^{19}/_{32}$ inches. Outer portion 80 of cap 74 has an outside diameter ($OD_2$) that is preferably slightly less than outer diameter ($OD_1$) of body 12, that is slightly less than about $1^{29}/_{32}$ inches. Preferably, end cap 74 has a reflector 78 affixed to portion 80. Reflector 78 is preferably red in color to increase visibility of the bicycle; however, other colored reflectors can be utilized. End cap 74 preferably has a shallow width (w) so that the protrusion does not hinder the peddling or rotative movement of the bar/grip of the device being trailered. Preferably, width (w) should be less than about 7/16 inch.

End cap 74, as shown in FIG. 9 or end cap 70 as shown in FIG. 7 are optional features. Other configurations of end caps can also be used. As will be recognized, end caps may be force fit, glued, screwed or secured in other manners such as will be known to those of skill in the art. Additionally, an end cap of either configuration can also be used to cap first end 14 of body 12.

Figure 10:
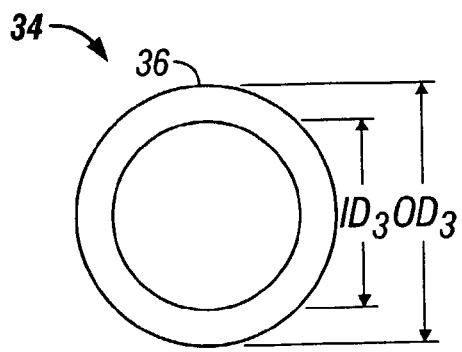
FIG. 10 is a top view of an o-ring vertical stop means.

Apparatus 10 can be attached to a bicycle by placing a bicycle seat stem through aperture 18 of body 10. A vertical stop 34 can used to control the vertical position apparatus 10 rides on the seat steam. As shown in FIG. 10, vertical stop 34 can be an o-ring 36 having an internal diameter ($ID_3$) slightly smaller than the bicycle seat stem on which apparatus 10 will be mounted. Additionally, o-ring 36 has an external diameter ($OD_3$) greater than diameter ($h_1$) of aperture 18 to prevent sliding of o-ring 36 through aperture 18.

Preferably, o-ring 36 has an internal diameter ($ID_3$) of about ⅞ inch and an external diameter ($OD_3$) greater than about ⅝ inches. Those of skill in the art will recognize that the internal diameter ($ID_3$) and external diameter ($OD_3$) can vary with the size of the bicycle stem on which apparatus 10 is being set and upon the size of aperture 18. Preferably, o-ring 36 is made from Buna N (butadiene acrylonitrile) rubber. The elasticity of Buna N allows for expansion and contraction around the seat stem. As will be recognized other materials of similar properties may likewise be used to form o-ring 36. Preferably, a vertical stop 34 is placed above and below apparatus 10 to prevent vertical travel in either direction. In addition to an o-ring, vertical stops of other configurations such as collars, pins, or bearings may be utilized.

Figure 11:
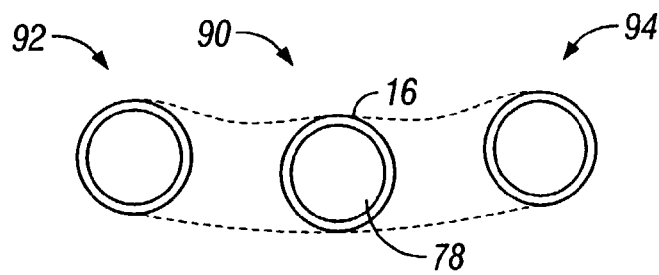
FIG. 11 depicts a rear view of a trailer apparatus as it rotates on a bicycle stem.

As shown in FIG. 11, end 16 of apparatus 10 pivots about the seat stem. Position 90 represents a position in which apparatus 10 is directly behind and in aligned relationship with a bicycle. As apparatus 10 pivots to the right of the bicycle to position 94, a moment arm is produced about the seat steam with a slight upward concavity. As apparatus 10 swings back across to the left side of the bicycle to position 92, a similar moment arm is created in the opposite direction. These moment arms are created as a result of the angled nature of aperture 18. The movement of apparatus 10 about the seat stem in this manner ensures apparatus 10 will stay within about 45° at position 90. Silicone or other lubricants can be applied to the seat stem to ensure smooth rotation.

Figure 12A:
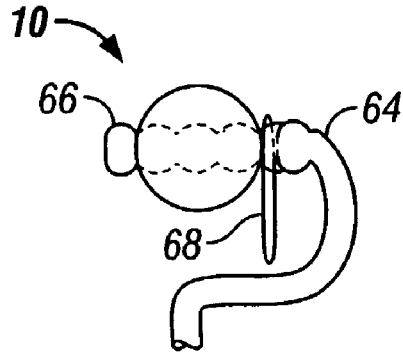
FIG. 12A and B depict steps of securing a bar/grip to a trailer attachment apparatus.
Figure 12B:
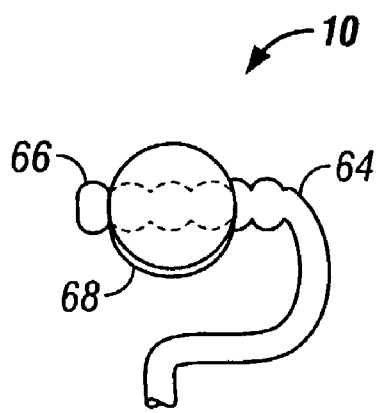

As shown in FIGS. 12A and B, bar/grip 64 is preferably secured to apparatus 10 to prevent bar/grip 64 from coming out of socket 20 during use. One method of securing bar/grip 64 is to use ring 68. Ring 68 can be placed onto bar/grip 64 which is subsequently inserted into socket 20. Ring 68 is pulled under apparatus 10 and then stretched over bar/grip end portion 66 and released. Preferably, tabs 120, 122, and 124 (FIGS. 1 and 3) are utilized to hold ring 68 in position about apparatus 10.

Preferably, ring 68 is manufactured from Buna N to allow for expansion and contraction around bar/grip 64. The elasticity of ring 68 allows for rotative movement of the bar/grip, but ensures it does not slide out. Other materials with similar properties can also be utilized. Because ring 89 should fit snuggly, it is preferred to pre-stretch ring 68 before using. Ring 68 should have an internal diameter large enough to encompass apparatus 10 while being secured on opposite ends by bar/grip 64. Bar/grip 64 should be firmly held in socket 20 but preferably is secured such that bar/grip 64 can rotate within socket 64. As will be recognized, the size of ring 68 can be varied with the size and configuration of bar/grip 64 and apparatus 10. This method of securing is equally applicable to any of the socket embodiments disclosed in FIGS. 1–7 and 16 or other similar sockets as well as to both open and closed bar/grips with minor variations such as would be understood by those of skill in the art. Other means of securing bar/grip 64 such as latches, clips, straps, Velcro strips, pins, and similar methods such as will be known by those skilled in the art can also be utilized.

Figure 13:
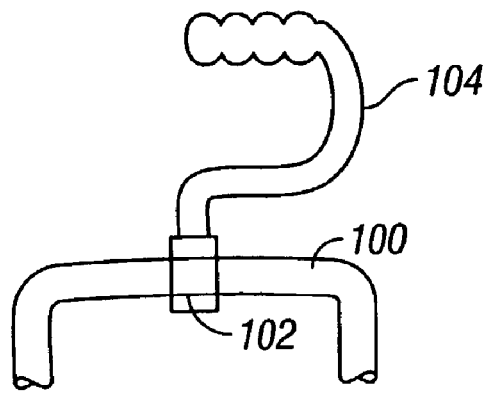
FIG. 13 depicts a bar/grip adapter attachment.
Figure 14:
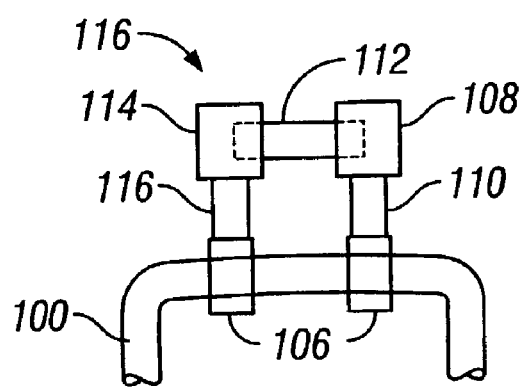
FIG. 14 depicts a second bar/grip adapter attachment.

As shown in FIG. 13, an "open" bar/grip attachment 104 may be attached to a closed bar/grip 100 by a mounting bracket 102. Attachment 104 allows use of apparatus 10 having an aperture 30 in second end 16, as opposed to a slot, with a trailering device having a closed bar/grip '100. FIG. 14 depicts a second attachment 116 for allowing trailering of a closed bar/grip '100. Attachment 116 has a removable member 112 that can be inserted in a socket and then reattached to end pieces 108 and 114. Attachment 116 is affixed to bar/grip '100 by mount brackets 106. Mounting brackets 162 and 106 of FIGS. 13–14 can secure attachments 104 and 116 to closed bar/grips 100 and '100, using pins, bolts, or screws.

Figure 15:
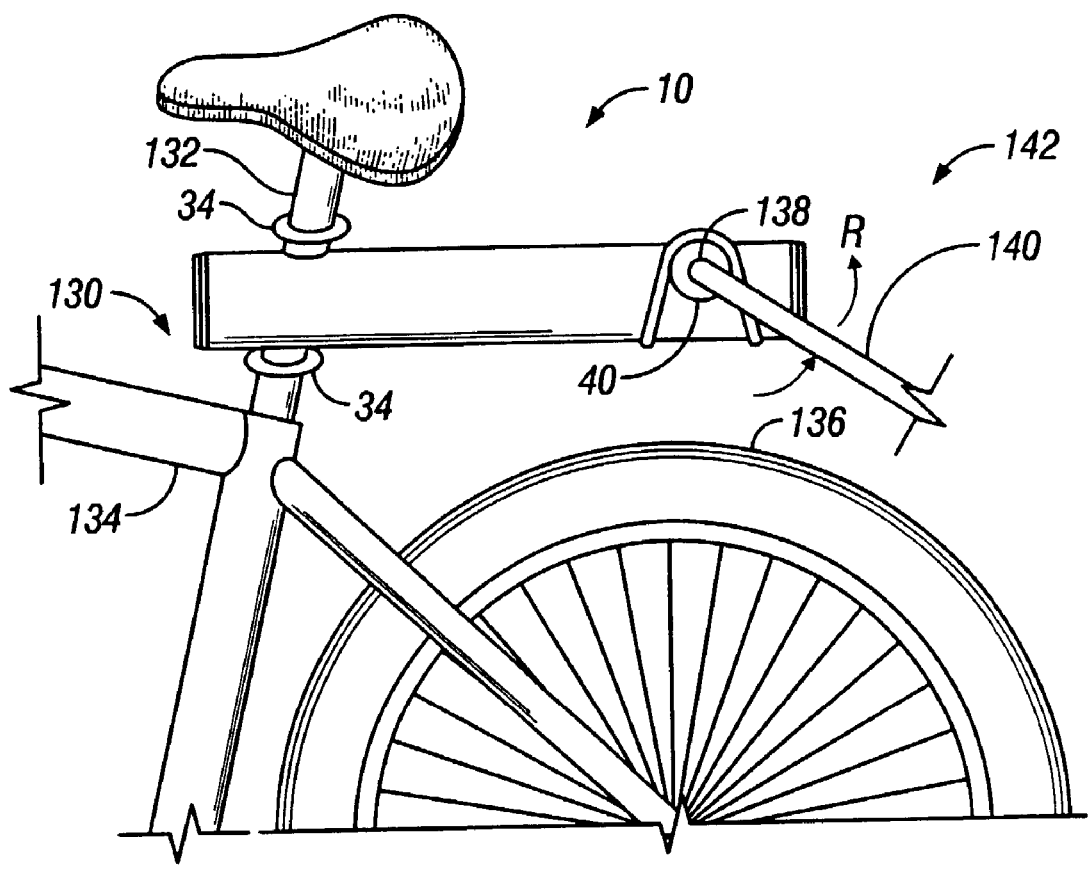
FIG. 15 depicts a bicycle with a trailer attachment apparatus pulling a cart.

Referring to FIG. 15, as can now be understood, apparatus 10 provides a unique and effective improvement to a bicycle 130 allowing the trailering of various trailering devices 142. The handle 138 of trailering device 142 can be secured into a socket, such as slot 40, which allows handle bar 140 to rotate in about the socket with movement R. Seat stem 132 is inserted through the aperture in apparatus 10. Vertical stops 34 prevent apparatus 10 from traveling up or down seat stem 132 without inhibiting rotation around seat stem 132.

In a preferred embodiment, a rear storage rack 10A in FIG. 17 is affixed, preferably permanently, to an upper portion of body 12. Rear racks are a popular accessory for many cyclists. Most cyclists seldom transport goods by bicycle. When cyclists do transport a small amount of goods it is usually cradled under one arm with the cyclist's other arm on the handlebars. This creates a potentially dangerous situation for rider because both hands are not on the handlebars. A rear rack enables the cyclist to use both hands on the handlebars for safer transporting of goods by bicycle. Traileering goods using a bicycle trailer hitch with cart or wagon provides safer riding as well, allowing cyclist to keep both hands on handlebars versus carrying an armload of goods under one arm with one hand on bicycle handle bars.

Typically, cyclists haul very little goods by bicycle because there is very little surface area or space to attach baskets, saddlebags, or rear racks to the bicycle. Most often, a basket is attached to handle bars or a rear rack is installed over the rear tire. The baskets and rear racks are more utilized than panniers (saddle bags), because these must be used in duality about the front or rear tire to balance the load. This is another reason trailering loads is becoming more popular with cyclists; anytime a heavy load is physically attached to the bicycle, there is risk that the bicycle and rider will become unbalanced and wreck the bicycle. A cart or wagon tracks behind the bicycle, allowing bicycle to remain in balance with load.

In the embodiment of the trailer attachment having rear rack 10A in combination with a trailer hitch, the cyclist has the option of trailering goods with cart or wagon, or transporting a smaller amount of goods on rear rack when hitch is not utilized. As shown in FIG. 11, the trailer attachment device swings about the seat post when cart or wagon is in tow. This allows for best tracking of cart or wagon behind bicycle while transporting goods by cart or wagon. However, the cyclist will not want the rear rack, with goods attached, to swing about seat post when a cart or wagon is not in tow.

It is common practice to utilize a quick release about the bicycle seat post, as shown in FIGS. 18 and 19. This enables the cyclist to move seat post up or down, but still locks seat in place. This same concept can be utilized for trailer hitch and rear rack combination. When the bicycle is utilized with cart or wagon, hitch will rotate about the seat post, as shown in FIG. 11. The quick release, shown in FIG. 18, will be in the open position, allowing rotative movement of the trailer hitch and rear rack about the seat post. When hitch is not in use, the quick release will be in the closed position, shown in FIG. 19. This keeps hitch, with rear-rack in place, from swinging when not in use for trailering purposes.

A bungee cord, industrial elastic cord, or other similar securing device can be utilized to secure goods in place on rear rack 10A.

The foregoing disclosure and description of the invention are illustrative and explanatory thereof, and various changes in the details of the illustrated apparatus and construction and method of operation may be made without departing from the spirit of the invention. Other possible features may be included with apparatus 10 such as colored or color-dyed raw materials, stickers and labels, and inserts, sleeves, grommets, bushings, or washers for securing or wear protection.

I claim:

1. An apparatus attachable to a bicycle seat stem for pulling a trailering device, comprising:
    an elongated body having a first end and a second end;
    said elongated body having an aperture proximate to the first end for receiving the bicycle seat stem and a socket proximate to the second end for attaching the trailering device;
    a rack affixed to said body for carrying; and
    a vertical stop means for vertically fixing the position of the apparatus on the seat stem, wherein said means is selected from the group consisting of O-rings, collars, pins, and bearings.

2. The apparatus of claim 1 wherein said aperture comprises an aperture in angled relationship to said elongated body allowing rotative movement of the body around the bicycle seat stem.

3. The apparatus of claim 1 wherein said socket comprises a slot.

4. The apparatus of claim 3 wherein said slot comprises a slot in a top portion of said elongated body.

5. The apparatus of claim 1 further comprising an elastic ring for securing the trailering device to the socket.

6. The apparatus of claim 1 further comprising a quick release mechanism operably connected to said body having a first position and a second position, said release fixing the position of the body relative to the seat stem when in the second position, thereby preventing rotation.

7. The apparatus of claim 1, further comprising an elastic cord for securing goods to said rack.

8. An apparatus attachable to a bicycle seat stem for pulling a trailering device, comprising:
    an elongated body having a first end and a second end;
    said elongated body having an aperture proximate to the first end for receiving the bicycle seat stem and pivotally securing said body about the seat stem, and a socket proximate to the second end for attaching the trailering device;
    a rack affixed to said body for carrying; and
    a quick release mechanism comprising a lever and a cam, said quick release mechanism having a first position and a second position, said quick release mechanism allowing rotative movement of said body around the seat stem when in the first position and preventing rotative movement when in the second position.

9. The apparatus of claim 8 wherein said body is constructed from PVC.

10. The apparatus of claim 8 wherein said socket comprises a slot.

11. The apparatus of claim 10 wherein said slot comprises a slot in a top portion of said elongated body.

12. The apparatus of claim 11 wherein the slot has a substantially U-shaped configuration.

13. The apparatus of claim 8 further comprising an elastic ring for securing the trailering device to the socket.

14. The apparatus of claim 8 further comprising a vertical stop means for vertically fixing the position of the apparatus on the seat stem, wherein said means is selected from the group consisting of O-rings, collars, pins, and bearings.

15. An improved bicycle for pulling a trailering device, wherein the bicycle has a seat stem which is removable from a bicycle frame, the improvement comprising:

a trailer attachment device, wherein said trailer attachment device comprises an elongated body having a first end and a second end, said elongated body further having an aperture proximate to the first end for receiving the seat stem and a socket in said body between the first end and the second end for attaching the trailering device; a rack affixed to said body; and a cord for securing goods to said rack.

16. The trailer attachment device of claim 15 further comprising an elastic ring for securing the trailering device to the socket.

17. The trailer attachment device of claim 15 further comprising a quick release mechanism operably connected to said body having a first position and a second position, said release fixing the position of the body relative to the seat stem when in the second position, thereby preventing rotation.

18. The trailer attachment device of claim 15 further comprising a vertical stop means for vertically fixing the position of the apparatus on the seat stem, wherein said means is selected from the group consisting of O-rings, collars, pins, and bearings.

* * * * *